United States Patent [19]
Thue

[11] Patent Number: 6,002,707
[45] Date of Patent: Dec. 14, 1999

[54] SPREAD SIGNAL SPECTRUM COMMUNICATION CIRCUITS AND SYSTEM

[75] Inventor: Baard H. Thue, Lino Lakes, Minn.

[73] Assignee: Honeywell, Inc., Minneapolis, Minn.

[21] Appl. No.: 06/481,543

[22] Filed: Apr. 4, 1983

[51] Int. Cl.[6] .............................. H04B 1/69; G01S 13/00
[52] U.S. Cl. .............................. 375/200; 342/13; 342/14; 342/16; 342/118; 342/134; 342/175; 342/202
[58] Field of Search .............................. 343/5 HM, 5 PN, 343/5 SA, 17.2, 17.5, 18 E; 375/1, 2.2, 200, 201, 202, 203, 204, 206, 207, 208, 209, 210; 342/13, 14, 16, 21, 134, 135, 145, 175, 189, 192, 193, 195, 196, 197, 200, 201, 202, 203, 204

[56] References Cited

U.S. PATENT DOCUMENTS

| | | | |
|---|---|---|---|
| 3,114,148 | 12/1963 | Lederman | 343/5 PN |
| 3,337,870 | 8/1967 | Allen et al. | 343/5 PN |
| 3,603,992 | 9/1971 | Goggins et al. | 343/5 HM |
| 3,714,573 | 1/1973 | Grossman | 343/5 PN |
| 3,719,945 | 3/1973 | Sletten et al. | 343/17.5 |
| 3,719,946 | 3/1973 | Sletten et al. | 343/5 HM |
| 3,725,926 | 4/1973 | Ares | 343/17.5 |
| 3,821,736 | 6/1974 | Kuck et al. | 343/17.5 |
| 3,914,762 | 10/1975 | Klensch | 343/5 PN |
| 3,972,042 | 7/1976 | Johnson | 343/5 HM |
| 4,359,736 | 11/1982 | Lewis | 343/17.2 PC |

*Primary Examiner*—Bernarr E Gregory
*Attorney, Agent, or Firm*—Albert K. Kau

[57] ABSTRACT

The present invention provides a covert radar system in which radar signals emitted are capable to search receiver thermal noise and, therefore, are substantially undetectable in the normal radar operating range.

9 Claims, 3 Drawing Sheets

SPREAD SIGNAL SPECTRUM COMMUNICATION CIRCUITS AND SYSTEM

This invention relates to covert communication systems, specifically, a radar system is disclosed which emits signal energy in a frequency domain which resembles receiver-inherent signal noise levels.

BACKGROUND OF THE INVENTION

Covertness of radar has persisted as a major problem in defense applications of radiation based sensors. The problem is sometimes known as "the beacon in the sky syndrome." Ordinary airborne radar emits signals from its antenna, and the RF energy travels forward and spreads out in density until the target is intercepted. The target reflects a small amount of the transmitted power back towards the radar. The return energy is compared with that which had been transmitted for target parameters including, among others, distance and rate of change of position, i.e. target speed. Systems such as these are some times referred to as target or range trackers, and the like.

On the other hand, an enemy may employ a search receiver for monitoring the electromagnetic radiation emitted by the radar system. For the radar to work properly, the radar wastes a great amount of energy which is used to an advantage by an enemy search receiver. This is, then, the "beacon in the sky syndrome."

It is well known in the art that to reduce the effectiveness of the search receivers, covert radars should use the widest possible signal spectrum for their transmissions. Additionally, systems may use sequential frequency hopping to spread the energy even further over the electromagnetic radiation spectrum. It is an object of the invention to provide a circuit which provides a wide frequency spectrum signal for radar transmission.

Wide frequency spectrum radar has long been recognized and desired for use in radar systems. However, a wide spectrum high energy system generates a very high energy narrow pulse in the time domain. Unfortunately, radar systems of the prior art are unable to transmit or receive such a high energy narrow pulse. It is therefore an object of the invention to provide a wide frequency spectrum radar signal in such a manner which obviates the need for very high energy narrow pulse transmitter and receiver systems.

It is another object of the invention to provide a covert radar system in which radar signals emitted are comparable to receiver thermal noise and therefore are substantially undetectable in the normal radar operating range.

DETAILED DESCRIPTION OF THE INVENTION

Figure 1:
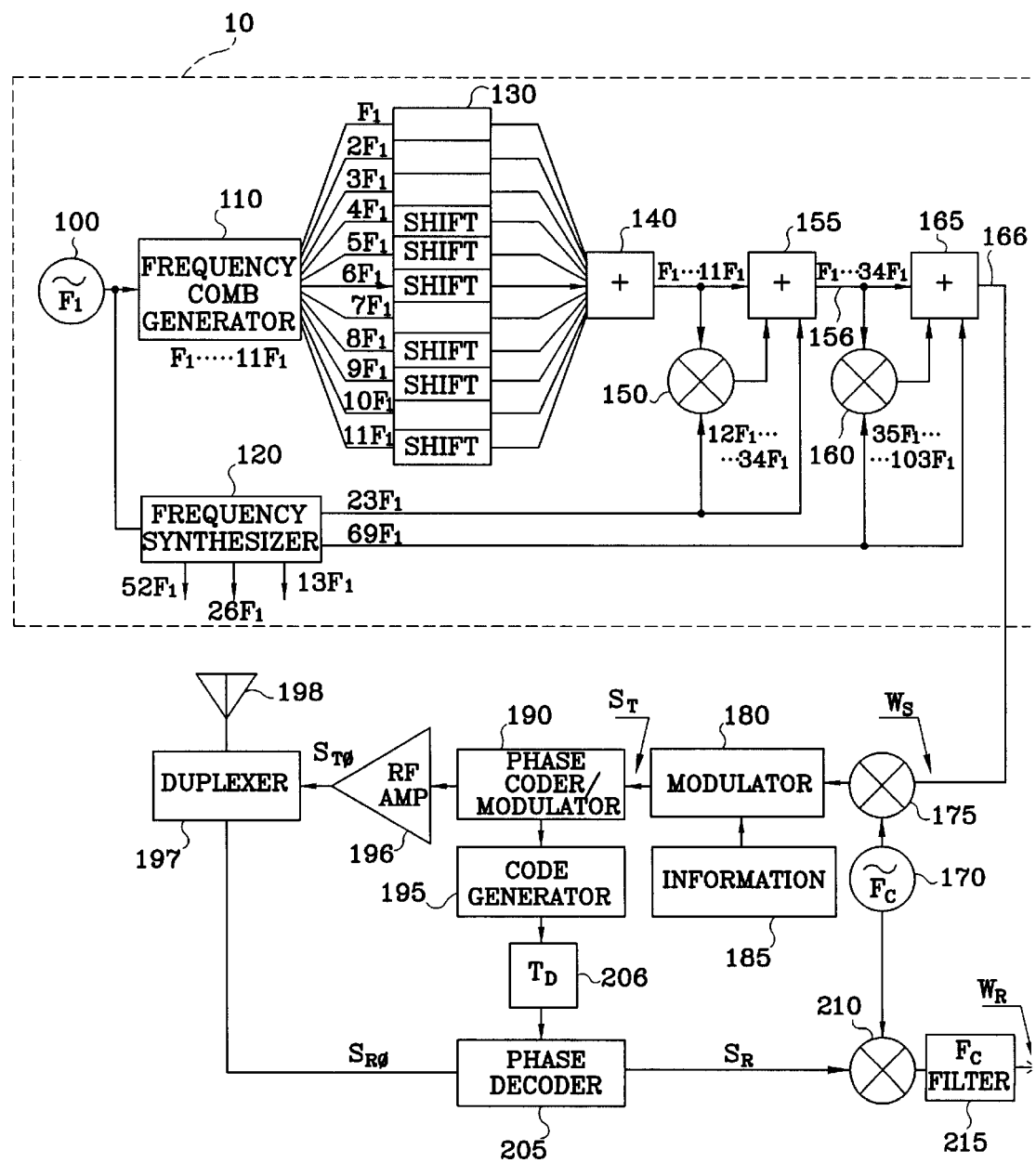
FIGS. 1 and 2 are a schematic block diagram showing one embodiment of the invention.
Figure 2:
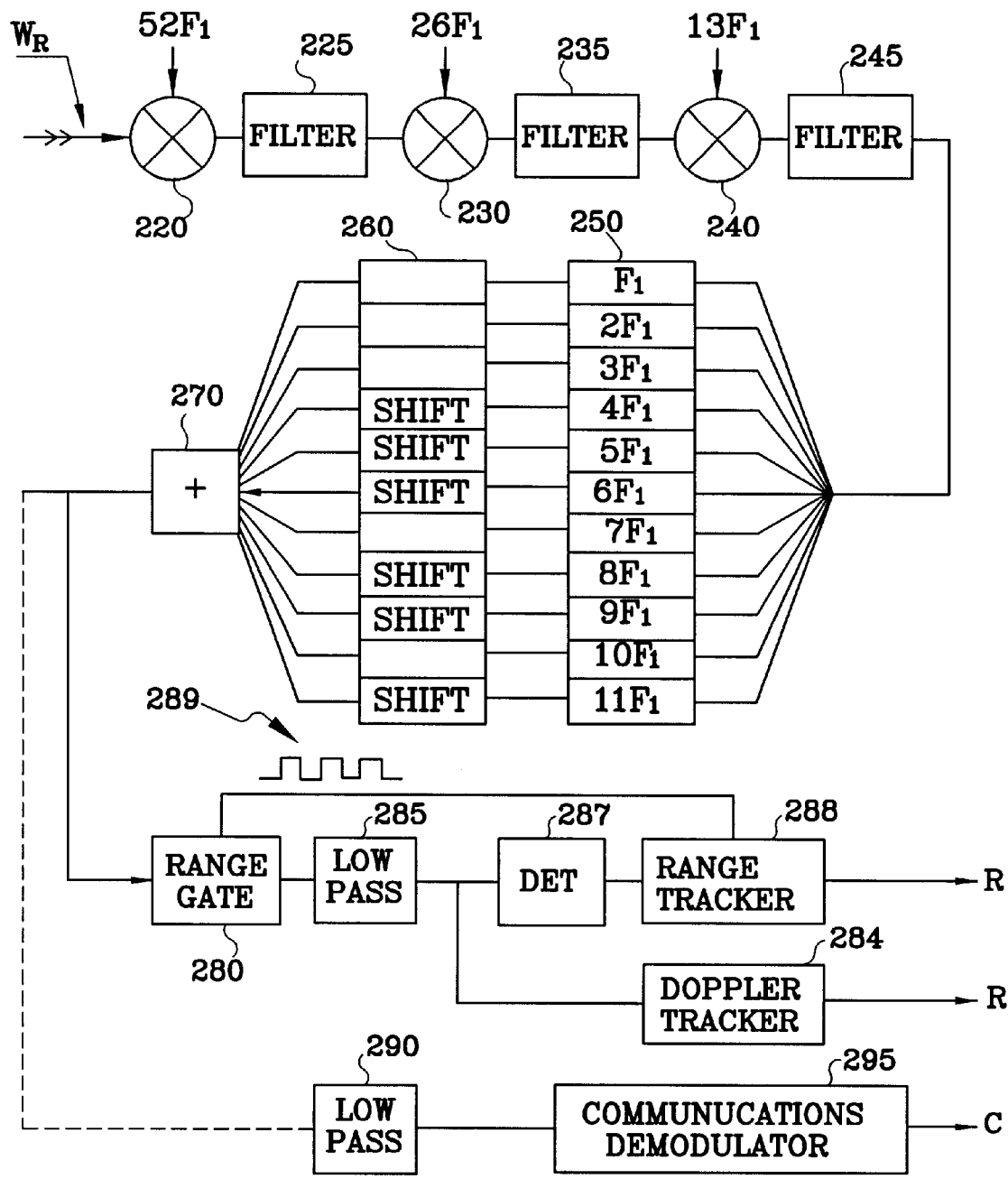

Shown in FIGS. 1 and 2 is a schematic block diagram of a covert radar system employing a wide frequency spectrum signal generator having a resultant output signal identified as "$W_S$" produced by the circuit elements within the dashed line block 100. The wide frequency spectrum signal generator of the present invention will now be detailed and described.

An oscillator 110 provides signal $F_1$ which is presented to frequency comb generator 110 and frequency synthesizer 120. Frequency comb generator provides eleven signals $F_1$, $2F_1$, $3F_1$, $4F_1$, $5F_1$, $6F_1$, $7F_1$, $8F_1$, $9F_1$, $10F_1$, and $11F_1$. In the discussion which follows, the prefix of $F_1$ always represents the multiple of the base frequency, for example, $F_1$. Thus, the comb frequency generator provides 10 harmonics of $F_1$ and $F_1$ itself.

Selected ones of the harmonic signals generated by frequency comb generator 110 are phase shifted by phase shifting means 130. By way of example, a Barker Code may be applied to the plurality of harmonics $F_1$ through $11F_1$. In these circumstances, only $4F_1$, $5F_1$, $6F_1$, $8F_1$, $9F_1$, and $11F_1$ are shifted by 180°. The remaining harmonics are passed through the phase shifting means 130 in their original form. All of the harmonics after passing through phase shifting means 130 are summed by summing means 140 for further harmonic signal generation.

The output of summing circuit 140 is presented to one input of mixer 150 and as one input of summing circuit 155. Mixer 150 mixes the selectively phase shifted eleven harmonics from summing circuit 140 and signal $23F_1$ produced by frequency synthesizer 120 resulting in the generation of harmonics $12F_1$ through $34F_1$ at the output thereof. Summing circuit 155 sums the output of summing circuit 140, the output of mixer 150 and signal $23F_1$. Thus, the output 156 of summing circuit 155 is harmonics $F_1$ through $34F_1$. The output of summing circuit 155 is presented to mixer 160 which mixes the harmonics $F_1$ through $34F_1$ with signal $69F_1$ from frequency synthesizer 120. Summing circuit 165 sums the output of summing circuit 155, the output of mixer 160, and signal $69F_1$ providing an output signal at 166 having a signal spectrum of 103 lines ranging from $F_1$ through $103F_1$ and is represented by the resultant signal $W_S$.

It is important to note that the phase of the harmonic signals derived from phase shifted signals $4F_1$, $5F_1$, $6F_1$, $7F_1$, $8F_1$, $9F_1$, and $11F_1$, is related to the phase shifted signals. For example, $19F_1$, $27F_1$, $65F_1$ and $73F_1$, which are derived directly from $4F_1$, $50F_1$, and $88F$ which are derived from $19F_1$, and $42F_1$ and $96F_1$ which are derived from $27F_1$ all are phase related to $4F_1$.

It should be obvious to those skilled in the art that the process of harmonic signal generation within block 100 may be expanded by the use of additional mixers, summing circuits, and signals from frequency synthesizer 120 to provide essentially a limitless number of signal lines all being harmonics of $F_1$. Nevertheless, the description which follows will only assume the 103 spectral lines, i.e. a composite signal consisting of 103 CW signals equally spaced in frequency and simultaneously present.

Figure 3:
FIG. 3 is a graphical sketch exemplifying a wide band radar signal.
Figure 4:
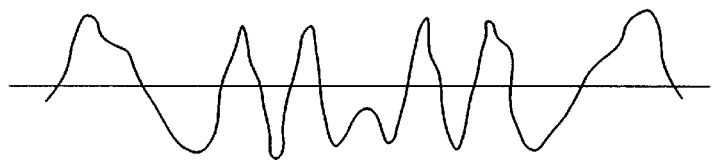
FIG. 4 is a graphical sketch exemplifying a wide band scrambled radar signal provided by the present invention.

For purposes of discussion, assume that phase shifting means 130 does not shift any of the first eleven CW signals, i.e. $F_1$ through $11F_1$. FIG. 3 exemplifies the resultant signal which is the sum of the 103 CW signals. As indicated in FIG. 3, a large voltage spike 310 appears periodically at the period of $F_1$. The impulse-like function exemplified by pulse 310 of large amplitude and narrow pulse width is not practical to directly transmit or receive because of its high energy and narrow pulse width. In the present application, phase shifting means 130, as already described, predistorts the selected continuous wave signals in such a manner so that the resultant signal $W_S$ in time domain has substantially uniform peak levels of a plurality of peaks distributed in time. This was accomplished by selecting the phase of the original constituent harmonics in a satisfactory fashion using the Barker Code. Of course, many phase code combinations may be used, the important principle involved being that the ultra wide band signal can be practically generated avoiding a high energy narrow pulse transmission by the technique just described. Such a wide band signal utilizing the phase shifting means is illustrated in FIG. 3 in which the peak amplitude of the excursions of the signal $W_S$ are substantially uniform over time and avoids the generation of a large amplitude narrow pulse width pulse. The signal illustrated in FIG. 4 is easily transmitted because of the absence of the impulse function. Nevertheless, the wave form exhibited in FIG. 4 represents the same frequency and energy content as that in FIG. 3. As will be shown, for a useful radar or communication system, the wave form of FIG. 3 must be reconstructed from the wave form exhibited by FIG. 4. Note that FIGS. 3 and 4 are only exemplary and no inferences, except those suggested, are to be inferred therefrom.

Figure 5:
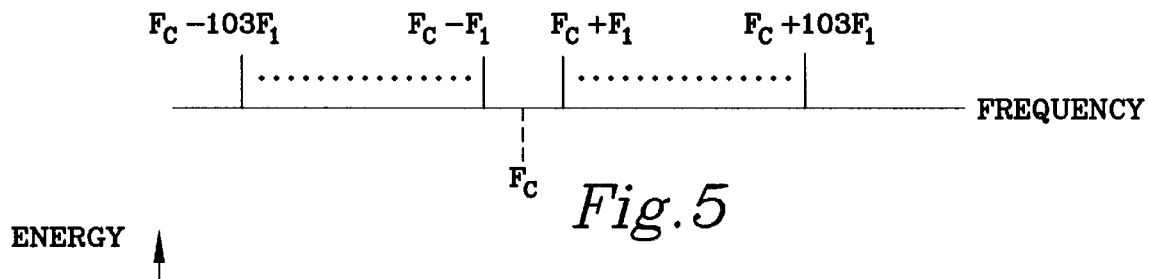
FIG. 5 is a graphical sketch of a frequency domain frequency spectrum.

Again referring to FIGS. 1 and 2, signal $W_S$ subsequently modulates in mixer 175 an arbitrary but sufficiently high frequency carrier signal $F_c$ provided by oscillator 170. Mixer 175 provides an output signal which is the equivalent of 103 CW signals on each side of the carrier frequency $F_c$ as illustrated in FIG. 5—thus 206 CW signals ranging in frequency from $F_c-103F_1$ to $F_c+103F_1$.

Again referring to FIGS. 1 and 2, the output of mixer 175 is presented to modulator 180 in which information signals provided by block 185 may modulate the 206 CW signals (with carrier) to provide the intended information thereon. The output of modulator 180, indicated as $S_T$, is presented to an input of phase coder/modulator 190 which is controlled by code generator 195. The output of phase code modulator 190 is presented to RF amplifier 196 for subsequent transmission by antenna 198 through an antenna duplex 197.

Figure 6:
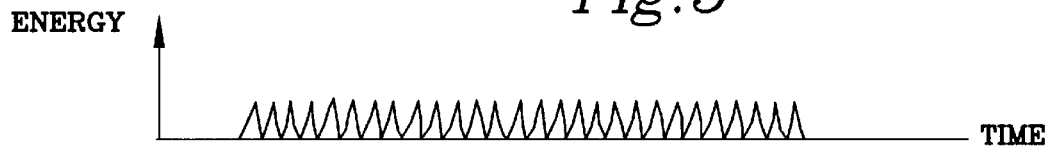
FIG. 6 is a graphical sketch of a transmitted signal of the covert radar system of the present invention.

The phase coder 190 is provided to deceive a "smart" energy search receiver from detecting the carrier frequency. The output of modulator 180, designated as signal $S_{T\phi}$ is a signal consisting of the 206 CW signal components. Phase coder 190 phase codes signal $S_T$ in such a manner so as to produce the phase coded output signal, $S_{T\phi}$. Signal $S_{T\phi}$ is transmitted and the emitted energy therefrom appears as noise to a search receiver as illustrated in FIG. 6. FIG. 6 represents signal $S_{T\phi}$ which is a wide instantaneous frequency spectrum signal of low energy having spectrum components between $F_c-103F_1$ and $F_1+103F_1$. The RF amplifier 196 is easily capable of transmitting such a signal since, as aforesaid, the signal does not contain a narrow pulse width-high energy pulse normally associated with a wide frequency spectrum signal. Of course, for a useful communication system, code generator 195 which phase codes signal $S_T$ must be known and utilized in a receiver for retrieving the desired information.

Code generator 195 may be, by way of example, a Barker Code generator providing digital output pulses representing "1's" and zero's in time domain. Phase coder/modulator 190 may be a biphase switch for 180° phase shifting the input thereof in accordance with selected generated code provided by code generator 195. Many codes are, of course, possible, but the principle is to make the signal look like random noise and therefore be undetectable. Therefore, the code may be any random code as long as it is known so that it can be used in the receiver to retrieve the original CW signals.

The receiver portion of the communications system shown in FIGS. 1 and 2 will now be detailed. Again, assuming a radar system, antenna 198 is connected to a duplexer 197 for transmitting $S_{T\phi}$ from amplifier 196 and presenting a received signal $S_{R\phi}$ from space to the receiver circuit arrangement. Duplexer 197 and its arrangement in FIGS. 1 and 2 are well known. The subscripts "R" and "T" indicate a received and transmitted signal respectively, and $\phi$ represents a phase coded signal according to code generator 195.

In a radar system, the received signal $S_{R\phi}$ obtained from antenna 198 through duplexer 197 is presented to phase decoder 205. The code generator 195 is presented to phase decoder 205 through time delay circuit 206. The time delay 206 is controlled in such a manner so as to synchronize the output of code generator 195 with the incoming signal $S_{R\phi}$. In a radar system, $S_{R\phi}$ represents a return signal which is signal $S_{T\phi}$ reflected from a target. The purpose of phase decoder 205 is to reconstruct a received signal $S_R$ which is like the form of signal $S_T$. Phase decoder 205 applies a phase shift to the received signal in accordance with the code provided by code generator 195 but opposite in phase. Accordingly, $S_R$, the output of phase decoder 205, is produced and is similar in form to $S_T$. Note that $S_{R\phi}$ represents a reflected signal from a target which usually has a much lower amplitude than $S_{T\phi}$ and is impacted by the speed of the target—Doppler effect.

After signal $S_R$ has been produced, the carrier signal, $F_c$, contained in signal $S_R$ is removed from received signal, $S_R$, by mixer 210 which mixes signal $S_R$ and signal $F_c$ provided by oscillator 170. The output of mixer 170 is filtered by a carrier frequency filter 215 which provides an output signal designated $W_R$ which now contains 103 CW signals exactly like the CW signal of $W_S$. Signal $W_R$ derived from the received signal is a wide frequency spectrum signal similar to signal $W_S$. Signal $W_R$ must be processed in such a fashion for the received signal to be usable in a communication system and must be further compressed for practical processing.

Having stripped the incoming received signal of the carrier frequency by the combination of mixer 210 and filter 215, it remains to retrieve, some if not all, the original eleven CW signals produced by the comb generator 110. Of course, one must keep in mind that the eleven CW signals have been phase coded by phase shifting means 130 described as aforesaid. Referring again to FIGS. 1 and 2 and particularly to FIG. 2, signal $W_R$ which contains 103 CW signals is mixed in mixer 220 with a signal $52F_1$ from frequency synthesizer 120. Mixer 220 provides the function of folding the 103 CW signals of the spectrum. The mixer 220 output is filtered by filter 225 for passing signals $F_1$ through $51F_1$. The output of filter 225 is mixed in mixer 230 with signal $26F_1$ also provided by frequency synthesizer 120. The output of mixer 230 is passed through filter 235. Mixer 230 and filter 235 provide essentially the same function as mixer 220 and mixer 225. Mixer 230 folds the 51 CW signals and the resulting output signal of filter 235 is 25 CW signals $F_1$ through $25F_1$. The output of filter 235 is mixed with signal $13F_1$ also provided by frequency synthesizer 120 in mixer 240 whose output is filtered by filter 245 for passing CW signals $F_1$ through $12F_1$.

Having thus far reduced the received signal $W_S$ to 12 CW signals of the spectrum, $F_1$ through $12F_1$, it remains to reconstruct the transmitted signal for proper form for useful communication. This is accomplished by filter means 250, phase shifting means 260, and summing means 270. Filter means 250 provides eleven separate narrow bandwidth filters for providing signal components of frequencies $F_1$ through $11F_1$ which form, at least in part, components of the output signal of filter 245 containing CW signals $F_1$ through $12F_1$. Therefore, filter means 250 provides eleven CW signals which represent the original eleven CW signals produced by comb generator 110. However, the phase of the signals produced by filter means 250 are still scrambled as a result of shifting means 130. Therefore, phase shifting means 260 is provided for phase shifting—"backwards"— the same signals which were phase shifted by phase shifting means 130, namely, signals $4F_1$, $5F_1$, $6F_1$, $8F_1$, $9F_1$, and $11F_1$ as indicated in FIG. 3.

Summing means 270 is provided for summing all of the individual eleven CW signals which have been phase shifted by phase shifting means 260 as well as those which have not been phase shifted to produce a signal which is related to the simple sum of the eleven CW signals produced by frequency comb generator 110 as exemplified in FIG. 3. Thus, it has been shown how a signal like that in FIG. 3 may be generated, scrambled, transmitted and received and unscrambled for information processing.

Particularly in radar systems, a signal similar to the one illustrated in FIG. 3 may be utilized in a radar system many which are well known. As is well known, the greater number of the original frequencies produced by the comb generator 110, the sharper will be the pulse 310 allowing greater accuracy for range detection in radar systems.

An example of a radar signal processing system applicable to such a produced pulse is also shown in FIG. 2. The output of the summing circuit 270 is presented to range gate 280. The output thereof is presented to a detector 287 through a low pass filter network 285. The output of detector 287 is presented to a range tracker 288 which in turn controls the range gate through a series of selected pulses 289. The range tracker provides an output signal R related to the target range between the sending radar signal and the target. The range tracker system as briefly presented is well known in the art and therefore will not be detailed herein. Briefly, assume that two periods of $F_1$ were transmitted. This would be under the control of information circuit block 185 which would pass the output of mixer 175 through modulator 180 for two periods of $F_1$. Upon reflecting from an external target, the same two periods of $F_1$ would return and would be presented to range gate 280 since the signals or pulses at frequency $F_1$ would be like those shown in FIG. 3. Properly spaced gate pulses provided by the range tracker 288 would extract signal energy of the signal provided by summing circuit 270 for subsequent low pass filtering and integration by low pass filter 285. In turn, detector 287 provides thresholding to complete the radar range function as is known in conventional radar art. From the information, the delay time between the sending signal known by information in block 185 and the time upon a complete return trip gives a direct indication of range between the radar transmitter and the target. The range gate and tracker work together to find the center of the major pulse illustrated in FIG. 3 to get a precise range output R.

Figure 7:
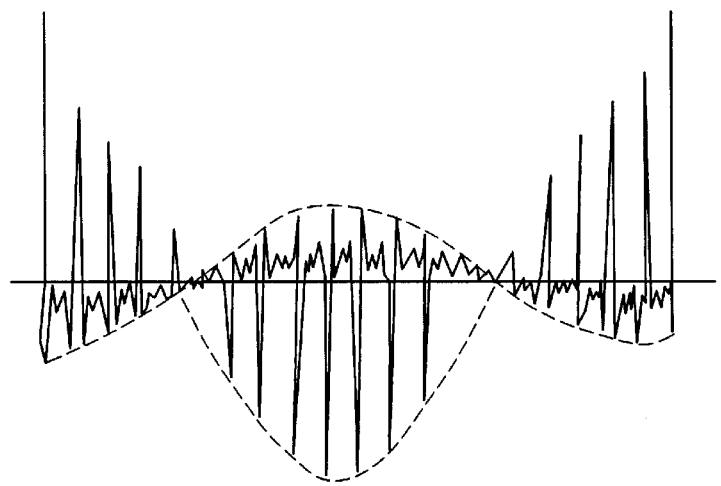
FIG. 7 is a graphical sketch exemplifying Doppler shift detection.

The signal information contained in the signal of the output of summing means 270 is also capable of being used for determining a Doppler shift in the returned signal by means of a Doppler tracker 284, also well known in the art. This is illustrated in FIG. 7 which shows a plurality of $F_1$ returned pulses which are amplitude modulated. The amplitude modulation has a frequency component indicative of the Doppler frequency and utilized in some circumstances in range gating the returned signals. The format decodes itself into a sampled Doppler output with a sample rate equal to the $F_1$ line spacing. Simple Nyquist filtering will, therefore, recover Doppler frequency directly in the process of range gate and returned signals.

Still another use of the system shown in FIGS. 1 and 2 is a covert communication system in which the transmitted signals are scrambled to look like noise to a search receiver. In this situation, the output of summing means 270 is presented to a low pass filter for obtaining variations in the amplitude of the periodic $F_1$ return signal from which communication demodulator 295 can obtain the information supplied by information in block 185 which can be a frequency modulator or an amplitude modulator or a phase shift key modulator. The combination of low pass filter 290 and communication demodulator 295 are well known.

The embodiment shown in FIGS. 1 and 2 illustrate a wide frequency spectrum signal system which to a search receiver appears as noise and therefore within a normal operating range will be undetectable. The system as shown may be utilized in covert radar applications as well as covert communication systems. Although a particular use of a Barker Code has been utilized in the phase shifting technique for obtaining a wide band signal while avoiding a high energy narrow pulse, other codes of course are possible, including pseudo random codes. Other codes are, of course, possible in the final stage phase coding for scrambling the RF signals to increase the difficulty of a search receiver from obtaining or determining the send frequency. Thus, if the search receiver is unable to lock in on a frequency, it will be unable to determine the distance away from the radar and the search receiver since insufficient energy is available for making a measurement.

The embodiments of the invention in which an exclusive property or right is claimed are defined as follows:

1. An apparatus for generating a spread spectrum frequency signal comprising signal generating means capable of simultaneously generating a plurality of selected frequency signals being a multiple of at least one primary frequency, said signal generating means further being capable of phase shifting selected ones of said plurality of signals by a selected phase shift value such that a resultant signal resulting from a simultaneous sum of said plurality of signals including said selected phase shifted signals is substantially uniform in amplitude and devoid of large amplitude signal segments.

2. A spread spectrum frequency signal generator comprising:

frequency generating means capable of providing a first plurality of harmonic frequencies of a first frequency;

phase shifting means for shifting the phase of selected ones of said first plurality of frequencies; and first summing means for summing at the same time said phase shifted frequency signals and remaining ones of said plurality of frequencies.

3. The apparatus of claim 2 further comprising:

frequency harmonic generating means responsive to said first frequency signal for providing at least one frequency harmonic of said first frequency;

at least one frequency mixing means responsive to said first summing means output signal and said first harmonic signal for providing a second plurality of harmonic frequencies of said first frequency signal;

second summing means for summing at the same time selected ones of said first and second plurality of frequencies and said first harmonic frequency.

4. The signal system of claim 3 wherein:

said transmitting means is capable of directing said phase coded first resultant into space.

5. The signal system of claim 4 wherein:

said receiving means is capable of producing said received signal being said phase coded first resultant signal reflected from a target located in space; and said receiving means further comprises range detection means responsive to said transmitted phase coded first resultant signal and said received signal for determining the range of said target.

6. The signal system of claim 4 wherein:

said receiving means is capable of producing said received signal being said phase coded first resultant signal reflected from a target located in space; and said receiving means further comprises target movement rate detection means responsive to said transmitted phase coded first resultant signal and said received signal for determining the target movement rate of said target.

7. A spread spectrum frequency signal system comprising:

a signal generating means having
- frequency spectrum signal generating means capable of generating a first plurality of harmonic frequency signals of a first frequency, and capable of phase shifting selected ones of said first plurality of signals,
- first summing means for summing at the same time said phase shifted ones and the remaining ones of said first plurality of signals and producing a first sum signal,
- signal mixing means for mixing a carrier frequency signal with said first sum signal, and producing a first resultant signal having a frequency spectrum including frequency components of said first plurality of signals,
- encoding means for phase coding said first resultant signal in accordance with a selected code;

transmitting means for transmitting said phase coded first resultant signal;

receiving means including,
- means for producing a received signal derived from said transmitted phase coded resultant signal,
- decode means for decoding said received signal in accordance with said selected code so as to generate a reconstructed resultant signal related to said first resultant signal,
- means for removing said carrier frequency from said received reconstructed resultant signal; and information means responsive to said reconstructed resultant signal for producing an information signal having selected frequency components of said first plurality of harmonic frequencies.

8. The signal system of claim 7 wherein said information means includes:

filter means capable of providing selected frequency signals indicative of selected frequency signal components of said reconstructed signal;

phase shifting means for shifting the phase of selected ones of said selected frequency signals;

second summing means for summing said selected ones of said phase shifted ones and selected ones of the remaining ones of said selected frequency signals and producing said information signal being a function of the sum thereof.

9. The signal system of claim 7 wherein said signal generating means further includes means for providing information in said transmitted phase coded first resultant signal, and said receiving means further includes means for extracting information from said received signal.

* * * * *